United States Patent
Macdonald

(10) Patent No.: US 7,305,793 B1
(45) Date of Patent: Dec. 11, 2007

(54) LURE ORGANIZING DEVICE

(76) Inventor: Jack Macdonald, 2705 Howard Ave., Oviedo, FL (US) 32765

( * ) Notice: Subject to any disclaimer, the term of this patent is extended or adjusted under 35 U.S.C. 154(b) by 0 days.

(21) Appl. No.: 11/415,503

(22) Filed: May 1, 2006

(51) Int. Cl.
 *A01K 97/06* (2006.01)
(52) U.S. Cl. .................................. 43/54.1; 206/315.11
(58) Field of Classification Search ................ 43/54.1; 206/315.11; 220/752, 770
 See application file for complete search history.

(56) References Cited

U.S. PATENT DOCUMENTS

| | | | | | |
|---|---|---|---|---|---|
| 1,716,868 | A | * | 6/1929 | Stephens | 211/74 |
| 2,573,431 | A | * | 10/1951 | Gibson | 43/54.1 |
| 2,860,679 | A | * | 11/1958 | Kouke | 211/70.2 |
| 2,899,103 | A | * | 8/1959 | Ebert | 43/54.1 |
| 3,004,657 | A | * | 10/1961 | Hyman | 220/23.87 |
| 3,164,185 | A | * | 1/1965 | Ingoldt | 211/70.2 |
| 3,350,810 | A | * | 11/1967 | Warner et al. | 206/315.11 |
| 3,378,134 | A | * | 4/1968 | Wilkinson et al. | 43/54.1 |
| 3,643,812 | A | * | 2/1972 | Mander et al. | 206/443 |
| 3,885,668 | A | * | 5/1975 | McClain | 206/499 |
| 3,980,115 | A | * | 9/1976 | Longo | 206/315.6 |
| 4,366,641 | A | * | 1/1983 | Price et al. | 43/54.1 |
| 4,487,316 | A | * | 12/1984 | Calhoun et al. | 206/443 |
| 4,505,386 | A | * | 3/1985 | Abrahamson | 206/315.11 |
| 4,756,412 | A | * | 7/1988 | Graves et al. | 43/54.1 |
| 4,759,148 | A | * | 7/1988 | Love | 43/54.1 |
| 4,827,658 | A | * | 5/1989 | Wolniak | 43/54.1 |
| 4,901,846 | A | * | 2/1990 | Lehman | 206/501 |
| 4,972,625 | A | * | 11/1990 | Barnes | 43/54.1 |
| 5,125,183 | A | * | 6/1992 | Tisdell | 43/54.1 |
| 5,186,329 | A | * | 2/1993 | Fogelberg | 220/528 |
| 5,188,243 | A | * | 2/1993 | Ruiz | 211/70.2 |
| 5,271,520 | A | * | 12/1993 | McAfee | 206/315.11 |
| 5,303,500 | A | * | 4/1994 | Luukonen | 43/54.1 |
| 5,311,698 | A | * | 5/1994 | Plost | 43/54.1 |
| 5,337,892 | A | * | 8/1994 | Zaffina | 43/54.1 |

(Continued)

FOREIGN PATENT DOCUMENTS

DE 3318207 A * 1/1985

(Continued)

*Primary Examiner*—Darren W. Ark

(57) ABSTRACT

A lure organizing device for permitting storage of lures to inhibit tangling of the lures during transport includes a base plate being insertable into a bucket. Each of a plurality of tubes is coupled to a top surface of the base plate. Each of the tubes extends upwardly from the top surface of the base plate. Each of the tubes removably receives one of a plurality of lures to organize the lures and inhibit the lures from becoming entangled. A handle is coupled to the base plate and extends between a portion of the tubes. The handle is graspable to facilitate lifting of the base plate and the tubes from the bucket.

4 Claims, 4 Drawing Sheets

U.S. PATENT DOCUMENTS

| | | | |
|---|---|---|---|
| D371,185 S * | 6/1996 | Mullins | D22/136 |
| 5,542,535 A * | 8/1996 | Dalton | 206/443 |
| 5,547,098 A * | 8/1996 | Jordan | 220/528 |
| 5,659,995 A * | 8/1997 | Hoffman | 43/54.1 |
| 5,797,491 A * | 8/1998 | Fierek et al. | 206/373 |
| 5,802,760 A * | 9/1998 | Campbell | 43/54.1 |
| 5,813,528 A * | 9/1998 | Bliek et al. | 206/315.11 |
| 5,836,446 A * | 11/1998 | Varnom | 211/70.6 |
| 5,971,333 A * | 10/1999 | Fiedor | 211/70.6 |
| 6,209,721 B1 * | 4/2001 | Sharpe et al. | 206/315.6 |
| 6,679,377 B2 * | 1/2004 | Maddox | 43/54.1 |
| 6,729,066 B1 * | 5/2004 | Howley | 43/54.1 |
| 6,774,792 B1 * | 8/2004 | Williams | 206/315.3 |
| 6,883,268 B2 * | 4/2005 | Fraser | 43/54.1 |
| 7,150,123 B1 * | 12/2006 | Fox | 43/54.1 |
| 7,159,735 B2 * | 1/2007 | Morse | 220/529 |
| 2006/0277814 A1 * | 12/2006 | Lucky | 43/54.1 |

FOREIGN PATENT DOCUMENTS

| | | | |
|---|---|---|---|
| JP | 7-227187 A | * | 8/1995 |
| JP | 10-327729 A | * | 12/1998 |
| JP | 2002-34414 A | * | 2/2002 |
| JP | 2005-204552 A | * | 8/2005 |
| JP | 2006-42705 A | * | 2/2006 |

* cited by examiner

LURE ORGANIZING DEVICE

BACKGROUND OF THE INVENTION

1. Field of the Invention

The present invention relates to bucket tackle systems and more particularly pertains to a new bucket tackle system for permitting storage of lures to inhibit tangling of the lures during transport thereof.

2. Description of the Prior Art

The use of bucket tackle systems is known in the prior art. The prior art commonly teaches sleeves for lures being extending out of a bucket or coupled to a side of the bucket.

While these devices fulfill their respective, particular objectives and requirements, the need remains for a device that has certain improved features to allow a lid of a bucket to be positioned over the device to maintain organization of lure in the device. Additionally the device allows for liquid on the lures to drain away from the lures.

SUMMARY OF THE INVENTION

The present invention meets the needs presented above by generally comprising a base plate being insertable into a bucket. Each of a plurality of tubes is coupled to a top surface of the base plate. Each of the tubes extends upwardly from the top surface of the base plate. Each of the tubes removably receives one of a plurality of lures to organize the lures and inhibit the lures from becoming entangled. A handle is coupled to the base plate and extends between a portion of the tubes. The handle is graspable to facilitate lifting of the base plate and the tubes from the bucket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
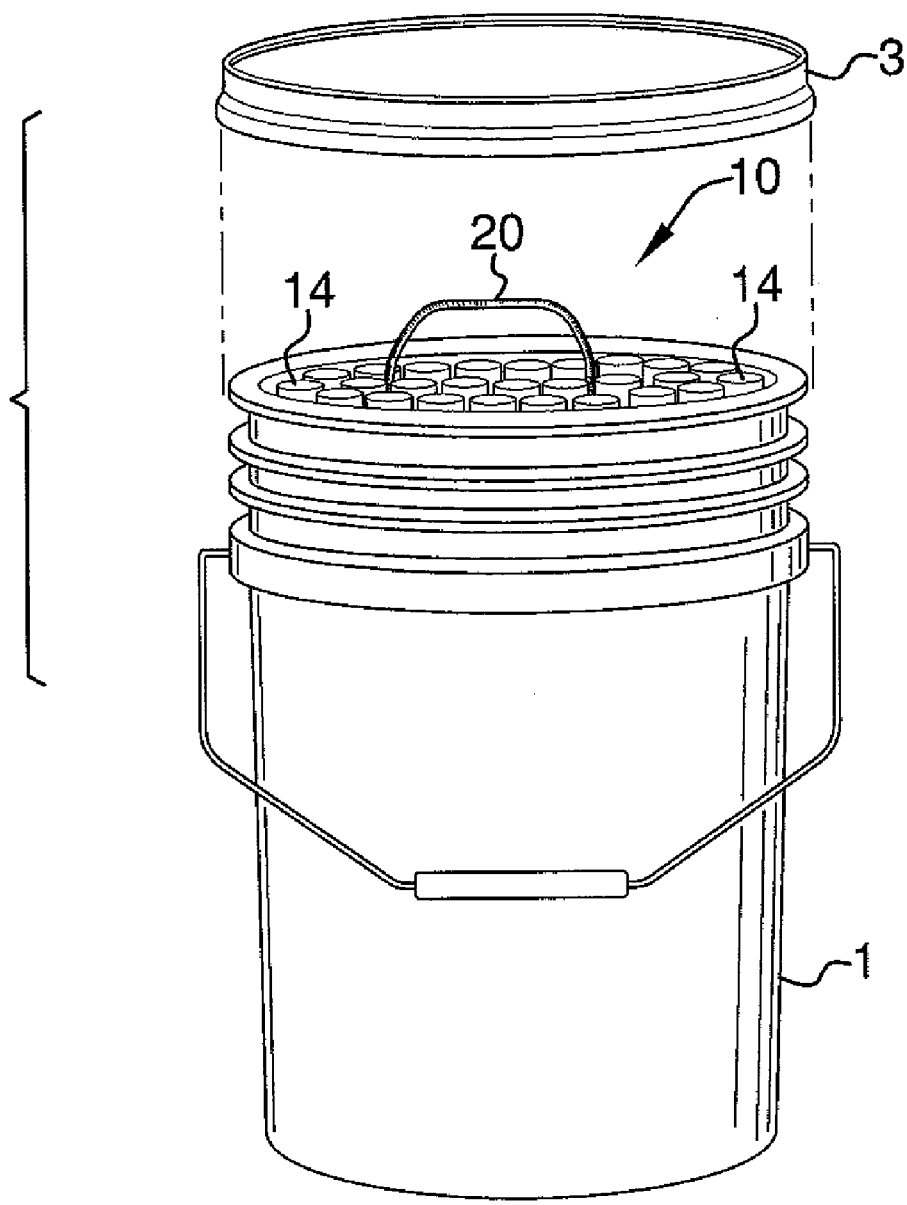
FIG. 1 is a perspective view of a lure organizing device according to the present invention shown the lid of the bucket removed.
Figure 2:
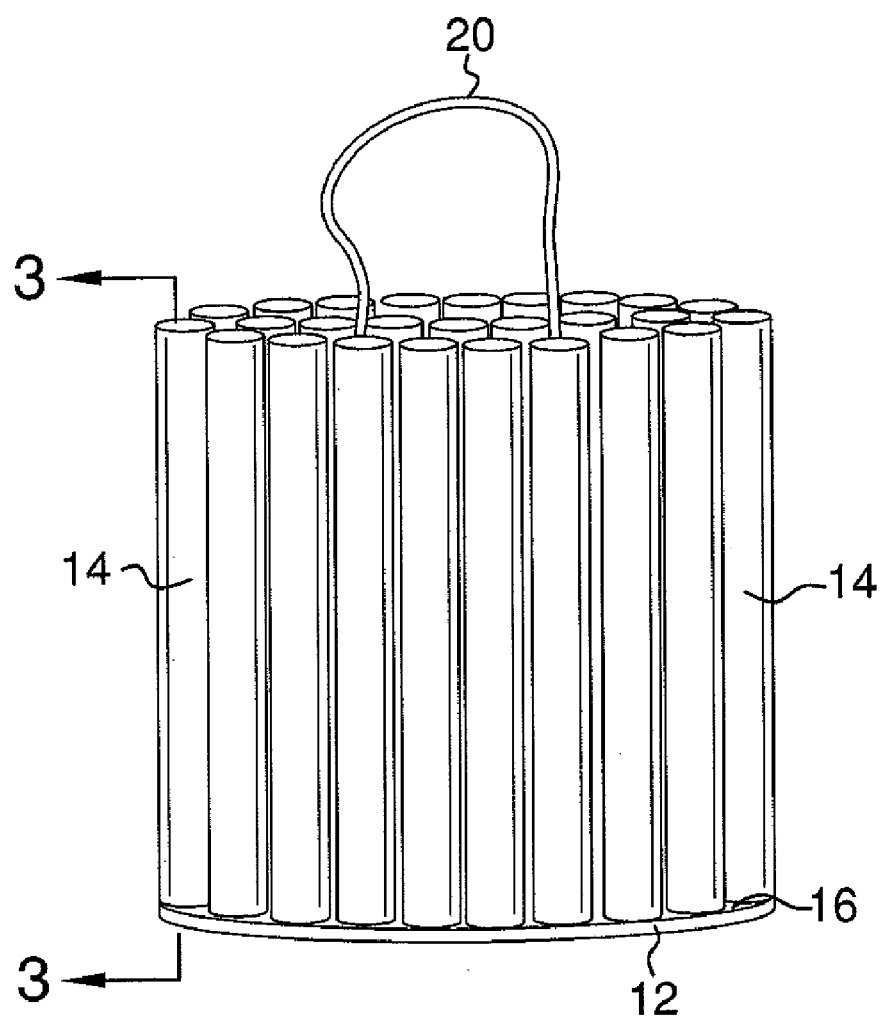
FIG. 2 is a perspective view of the present invention.
Figure 3:
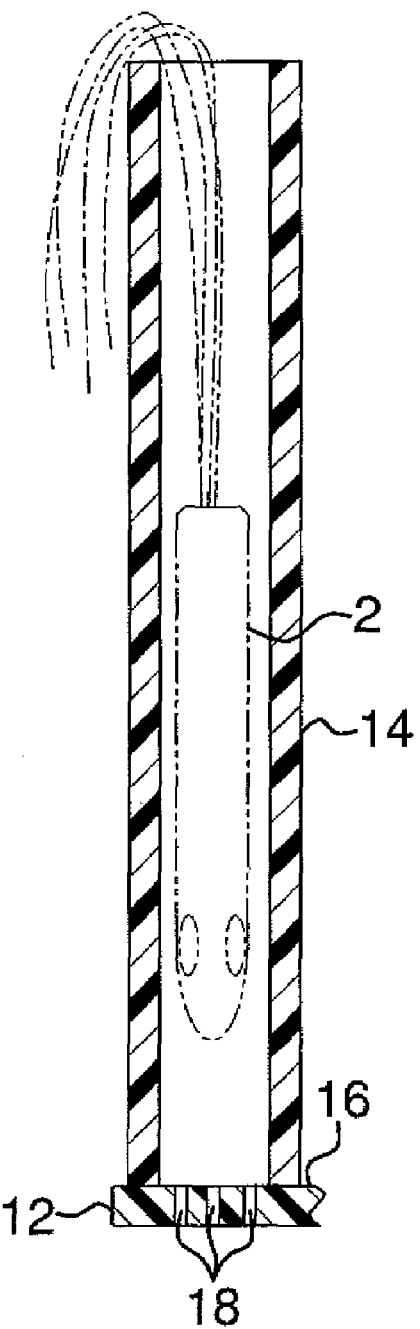
FIG. 3 is a cross-sectional view of the present invention taken along line 3-3 of FIG. 2.
Figure 4:
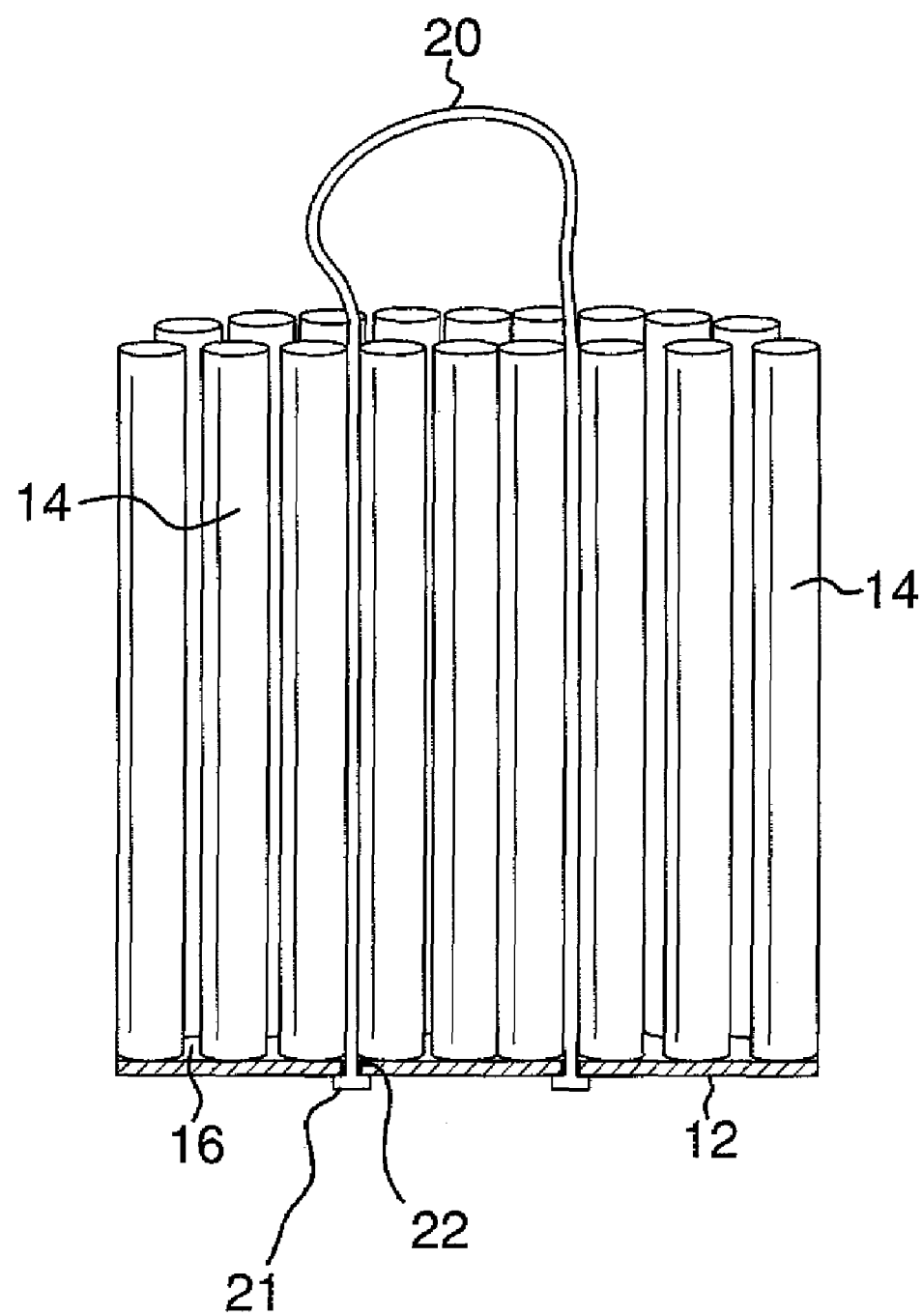
FIG. 4 is a partial cross-sectional view of base plate of the present invention.

With reference now to the drawings, and in particular to FIGS. 1 through 4 thereof, a new bucket tackle system embodying the principles and concepts of the present invention and generally designated by the reference numeral 10 will be described.

As best illustrated in FIGS. 1 through 4, the lure organizing device 10 generally comprises a base plate 12 being insertable into a bucket 1. Each of a plurality of tubes 14 is coupled to a top surface 16 of the base plate 12. Each of the tubes 14 extends upwardly from the top surface 16 of the base plate 12. Each of the tubes 14 removably receives one of a plurality of lures 2 to organize the lures 2 and inhibit the lures 2 from becoming entangled. Each of tubes 14 is positioned over at least one of a plurality of drainage apertures 18 extending through the base plate 12. The drainage apertures 18 permit liquid on the lures 2 to drain from the lures 2 and the tubes 14 when the lures 2 are positioned in the tubes 14. Each of the tubes 14 has a length less than a depth of the bucket 1 to permit a lid 3 to be placed on the bucket 1 to maintain the lures 2 in the tubes 14.

A handle 20 is coupled to the base plate 12 by end portions of the handle 20 extending through a pair of apertures 22 in the base plate 12 and a pair of enlarged ends 21 on the handle 20 being disposed below a bottom surface of the base plate 12, the pair of enlarged ends 21 being sized such that they cannot pass through the pair of apertures 22 and wherein the handle 20 extends between a portion of the tubes 14. The handle 20 is extendable over the tubes 14. The handle 20 is graspable to facilitate lifting of the base plate 12 and the tubes 14 from the bucket 1. The handle 20 is comprised of a flexible material to allow the handle 20 to be tucked between the tubes 14 when the handle 20 is not being used.

In use, the base plate 12 is inserted into the bucket 1 with the tubes 14 extending upwardly from the base plate 12. The handle 20 is then tucked between the tubes 14. The lures 2 are then positioned in the tubes 14 to organize the lures 2. The handle 20 can be extended to allow removal of the base plate 12 and the tubes 14 to allow liquid that has drained from the lures 2 and collected in the bucket 1 to be disposed of.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lure organizing system comprising:
    a plurality of lures;
    a bucket having a bottom wall and a peripheral wall being attached to and extending upwardly from said bottom wall, said peripheral wall including an upper edge defining an opening into said bucket;
    a base plate being insertable into the bucket;
    a plurality of tubes, each of said tubes being coupled to a top surface of the base plate, each of said tubes extending upwardly from said top surface of said base plate, each of said tubes removably receiving one of the lures to organize the lures and inhibit the lures from becoming entangled, each of said tubes being positioned in their entirety above said top surface of said base plate; and a handle being coupled to said base plate and extending between a portion of said tubes, said handle having first and second end portions that extend through a pair of apertures in said base plate, the first and second end portions having first and second enlarged ends that are disposed below a bottom surface of said base plate, said first and second enlarged ends being sized such that they cannot pass through said pair of apertures in said base plate, said handle being graspable to facilitate lifting of said base plate and said tubes from the bucket, said handle is comprised of a flexible material to allow said handle to be tucked between said tubes when said handle is not being used, said tubes each having a top end.

2. The device according to claim 1, wherein each of said tubes is positioned over at least one of a plurality of drainage apertures extending through said base plate, said drainage apertures permitting liquid on the lures to drain from the lures and said tubes when the lures are positioned in said tubes.

3. The device according to claim 1, wherein each of said tubes having a length less than a depth of the bucket to permit a lid to be placed on the bucket to maintain the lures in said tubes.

4. A lure organizing system comprising:

a plurality of lures;

a bucket having a bottom wall and a peripheral wall being attached to and extending upwardly from said bottom wall, said peripheral wall including an upper edge defining an opening into said bucket, a cover being removably positioned on and closing said opening into said bucket;

a base plate being insertable into the bucket;

a plurality of tubes, each of said tubes being coupled to a top surface of the base plate, each of said tubes extending upwardly from said top surface of said base plate, each of said tubes removably receiving one of the lures to organize the lures and inhibit the lures from becoming entangled, each of said tubes being positioned over at least one of a plurality of drainage apertures extending through said base plate, said drainage apertures permitting liquid on the lures to drain from the lures and said tubes when the lures are positioned in said tubes, each of said tubes having a length less than a depth of the bucket to permit a lid to be placed on the bucket to maintain the lures in said tubes, each of said tubes being positioned in their entirety above said top surface of said base plate; and a handle being coupled to said base plate and extending between a portion of said tubes, said handle having first and second end portions that extend through a pair of apertures in said base plate, the first and second end portions having first and second enlarged ends that are disposed below a bottom surface of said base plate, said first and second enlarged ends being sized such that they cannot pass through said pair of apertures in said base plate, said handle being extendable over said tubes, said handle being graspable to facilitate lifting of said base plate and said tubes from the bucket, said handle being comprised of a flexible material to allow said handle to be tucked between said tubes when said handle is not being used, and wherein top ends of said tubes being adjacent to a plane defined by said upper edge of said peripheral wall when said tubes are positioned in said bucket.

* * * * *